March 5, 1940.  R. R. GUNDERSON  2,192,548
FLUID PRESSURE POWER ACTUATOR
Filed Dec. 3, 1937
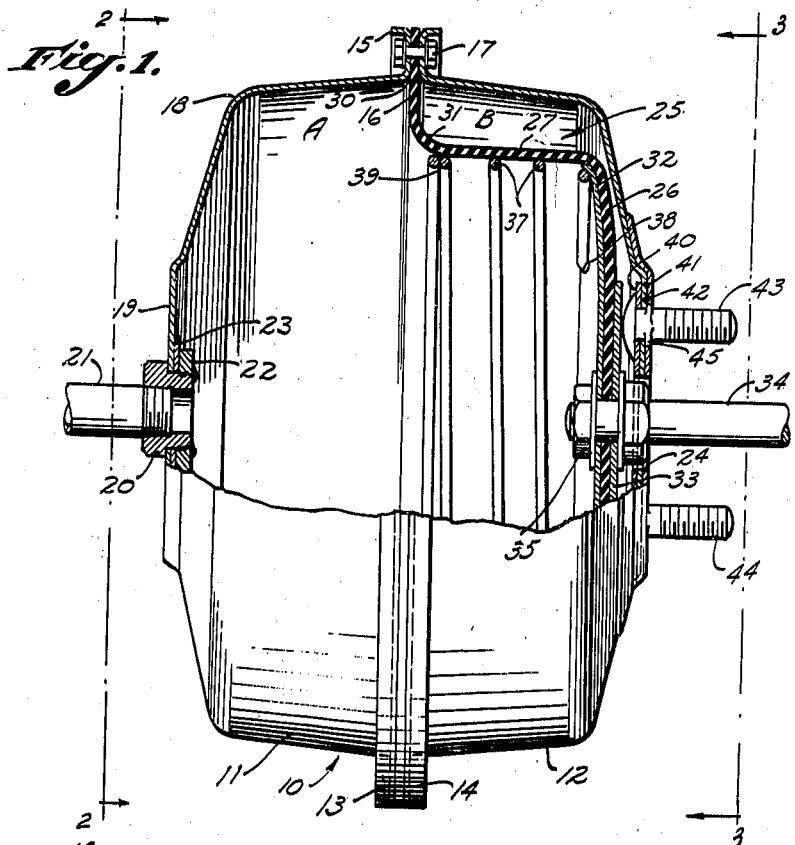
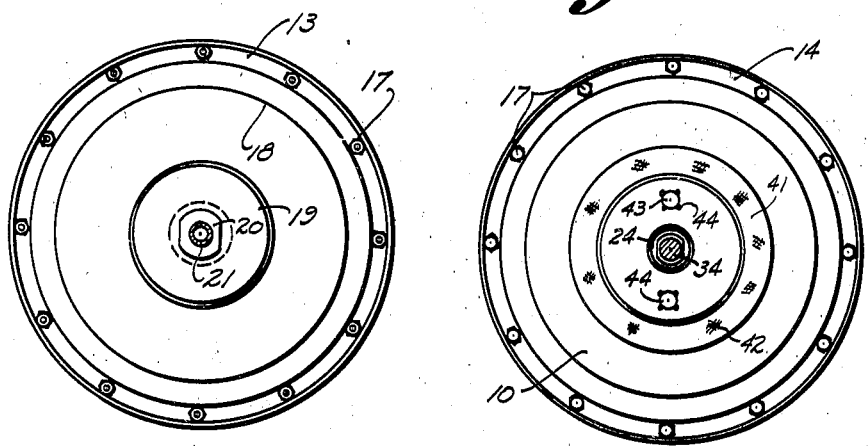
INVENTOR.
Ralph R. Gunderson,
BY
Robert W. Fulwider
ATTORNEY.

Patented Mar. 5, 1940

2,192,548

UNITED STATES PATENT OFFICE 2,192,548

FLUID PRESSURE POWER ACTUATOR

Ralph R. Gunderson, Los Angeles, Calif., assignor to Vacuum Power Brake Company, Los Angeles, Calif., a corporation of California Application December 3, 1937, Serial No. 177,880

8 Claims. (Cl. 121—48)

This invention relates to a fluid pressure actuated device known in the trade as a power actuator, and has particular application in fluid-operated brake systems, in which the booster serves to translate fluid pressure into mechanical force which is exerted to apply the brakes of the vehicle upon which the device is installed.

Actuators of this general type are commonly employed on heavy vehicles such as large automobile trucks and trailers continuously operated in carrying great loads, and in this service, brake actuators are subjected to unusually severe conditions both because of the heavy loads applied and because of the frequency with which the device is operated. The importance of having an actuator in such a system which is dependable and of long life cannot be over-emphasized, for the failure of a brake actuator may result in a heavily loaded truck running wild and causing great loss of life and damage to property. In spite of its urgency, however, the making of a dependable power actuator, free from the possibility of early fatigue failure, has heretofore persistently remained a problem.

An object of my invention, therefore, is to provide a power actuator having special provision against fatigue failure, both of the flexible diaphragm portion and of the housing.

Another object of the invention is to provide a power actuator of such construction that a particularly efficient operation of the device results.

Still another object of my invention is to provide, in a power actuator, means for preventing collapse of the diaphragm while not restricting its motion within the housing.

These and other apparent objects I attain in a manner which will be clear from consideration of the following description taken in connection with the accompanying drawing, of which:

Fig. 1 is a partial cross-sectional view taken in a plane through the axis of the power actuator.

Fig. 2 is an end view of the device taken from the left side of Fig. 1 in the direction of the arrow 2, as shown.

Fig. 3 is an end view of the device taken from the right side of Fig. 1 in the direction of the arrow 3, as shown.

My improved booster includes a housing 10, preferably composed of two opposed concave members 11 and 12 which when united form a substantially cylindrical space within. The members 11 and 12 of the housing are provided with opposing flanges 13 and 14, respectively, having edges turned at right angles for reinforcement, as at 15. Between the flanges 13 and 14 is clamped the flat rim 16 of a flexible diaphragm hereinafter described in detail, which separates the space within the housing into two chambers, A and B. Through the flanges 13 and 14 and the interposed diaphragm 16 are a number of bolts 17 which tightly clamp the two housing members 11 and 12 together, the diaphragm 16 being retained between and serving as a gasket to make an air-tight seal with both halves of the housing.

The housing member 11 extends from the flange 13 in a direction only slightly inclined to the axial direction, then bends sharply at 18 in a nearly radial direction and finally ends in a substantially radially-extending flat end 19 immediately surrounding the axis. Through an axial hole in the end 19 is placed a fitting 20 provided with a fluid passage therethrough and internally threaded to receive a pipe 21 through which air is exhausted from or into the chamber A in the normal operation of the device. The fitting 20 has a shoulder which abuts the end 19 on the outside, and is externally threaded on the other end to receive a nut 22 which is screwed thereon to tightly clamp the end 19 through the washer 23 to effect an air-tight seal.

The shape of the other half 12 of the housing is preferably substantially the same as that described above in connection with housing member 11, with the exception that an axial hole 24 is left open to the atmosphere to permit air to enter chamber B and force the flexible diaphragm toward the left side of the housing when air is exhausted from chamber A through pipe 21, and with the further exception that means for mounting the housing of the power actuator and special reinforcement are provided on the end of member 12, as will hereinafter be explained. The members 11 and 12 of the housing are preferably made of sheet metal and the shape of the housing may be said to be nearly cylindrical.

The flexible diaphragm 25, the flat rim 16 of which is clamped between the flanges 13 and 14, is concave with respect to the chamber A on its left in Fig. 1, and is preferably molded of rubber. The diaphragm comprises a nearly radial but dished end portion 26 of somewhat less diameter than that of the housing, a flat rim 16, and a cylindrical portion 27, connecting end 26 with rim 16. In the operation of the device, when air is exhausted through pipe 21, the diaphragm 25 is acted upon to move the nearly radial end portion 26 far past the plane of the rim 16 and nearly down to the opposite end of the housing. This requires that the diaphragm deflect considerably in that portion near the middle of the housing. I have found that if the diaphragm is so shaped that most of the deflection takes place at the point where the diaphragm is clamped, at 30, it will quickly fatigue and fail at this point. I have found, however, that when the diaphragm is constructed as shown herein, it does not easily fatigue and has a very long and entirely satisfactory life. Important features of the shape which result in such satisfactory operation are that the flat rim 16 extends inwardly a considerable distance from the wall of the housing before bending at 31 to conform to the cylindrical portion 27, and that the right angle bend at 31 is very gentle, the radius of curvature of this curve being relatively great. These features insure that the deflection of the diaphragm in the region of rim 16 and the bend 31 shall be gentle and uniform and at no place sharper than is consistent with long life of the diaphragm. The substantially cylindrical shape of the major portion of the diaphragm, moreover, is found, to contribute to uniformity of force exerted by the device throughout its entire stroke.

The nearly radial end portion 26, which is acted upon by air pressure to move the diaphragm, is supported on its inner face by a rigid dished circular plate 32 of the same diameter. A circular plate or washer 33 supports the diaphragm portion 26 on its outer side. The plate 32, diaphragm end 26, and plate 33 may all be clamped together on an axial rod 34 by the nuts 35 and 36 which are screwed on the rod 34. The rod 34 passes out of the housing through the hole 24 and connects to the brake mechanism (not shown), the hole 24 being sufficiently large to permit entrance of the nut 36 and to provide ample clearance therearound to permit the rapid passage of air through the hole 24 into chamber B.

To prevent collapse of the cylindrical portion 27 of the diaphragm when air is exhausted from chamber A and the radial end 26 has moved to the left, I provide a support within the diaphragm comprising a spirally wound resilient wire 37 forming a loosely wound coil having an outside diameter nearly equal to the inner diameter of cylindrical portion 27 of the diaphragm. One end of this coil is fastened at 38 to the plate 32 and the other end of the coil is brought around and fastened at 39 to the adjacent turn of wire. This construction provides many advantages. It maintains the portion 27 always in a substantially cylindrical shape throughout the entire stroke of the diaphragm, thus preventing sharp bending of the diaphragm at edge of plate 32 and insuring its long and satisfactory operation. At the same time, the supporting structure is flexible and will permit slight tipping and lateral adjustment of the rod 34 without seriously affecting the operation of the diaphragm. Another important advantage is that because of the axial compressibility of the supporting coil 37, a relatively long stroke of the diaphragm is permitted. In moving toward the left, the coil 37 will eventually contact the end of housing member 11 and further motion to the left can take place until the turns of the coil are tightly compressed together. Since only a few turns are present in the coil 37, the turns occupy only a short space, which means that practically the entire length of the housing is available for the stroke of the diaphragm. It should be noted that if a rigid supporting member were employed within the diaphragm to prevent its collapse, such a member would limit the stroke of the diaphragm in its leftward movement by abutting the end of housing member 11, and the stroke of the diaphragm would be much less than is possible with my construction. A further advantage is that the orderly travel and uniform shape of the diaphragm resulting from supporting it from within increase the efficiency of the device.

On the end of member 12, I provide means for mounting the housing and for reinforcing the housing at this point where large stresses are set up. Against the inside of the flat end of member 12 is placed a washer 40. Over the outside of the end of housing member 12 is placed a reinforcing plate of sheet metal 41 which covers a large portion of the end of said member and is preferably spot welded thereto at a number of places as at 42. The bolts 43 and 44 pass through holes in the washer 40, member 12, and plate 41, and are riveted as at 45 to tightly clamp washer 40 and member 12 together and to attach the bolts to the housing. These bolts are used to mount the housing of the actuator on the frame of a vehicle in the brake system of which the actuator is connected. The particular arrangement of reinforcement of the housing is important because of the direction of stresses on the housing when the device is operated.

In operation, when it is desired to operate the brakes by means of the actuator, the air is caused to be withdrawn from chamber A through pipe 21. Atmospheric pressure in chamber B then causes the diaphragm to be moved to the left against the reduced pressure on its left side. As the diaphragm moves, there is no dangerously sharp bend in it because of the flat rim 16 extending inwardly from the housing and because of the gentle curvature of the right-angled bend at 31. The diaphragm does not collapse at any stage in its travel because of the supporting coil 37 within. The motion of the diaphragm may continue toward the left until the turns of the coil 37 are tightly pressed together with the forward turn abutting the end of housing member 11. As the diaphragm moves to the left it carries with it the rod 34 which acts to apply the brakes. The distance the diaphragm moves is determined by the amount of the reduction in pressure in chamber A, togetehr with the resistance offered by application of the brakes.

With a pressure less than atmospheric in chamber A, it is evident that there is an unbalanced force on the housing member 11 directed toward the right due to the difference in pressure on the two sides of the housing member 11. This force is communicated to the housing member 12 and is absorbed in the reaction of the vehicle frame. The plate 41 thus reinforces the housing member 12 against the rightwardly-directed force exerted on its outer edge. It is very important that reinforcement of this nature be provided, for otherwise the frequent operation of the actuator would result in early fatigue failure of the housing member 12 near the place of mounting. This construction makes possible the use of a relatively cheap sheet metal housing by providing adequate reinforcement only at the points where failure would otherwise occur.

Whereas I have described my power actuator as applied in the application of vehicle brakes, the device is not so limited but may be employed wherever it is desired to translate fluid pressure into mechanical force, or vice versa.

It is also understood that various modifications and changes in design and construction may be made by those skilled in the art without departing from the spirit of the invention as defined in the appended claims.

I claim as my invention:

1. In combination, a housing, a flexible diaphragm separating the space within said housing into two chambers, fluid openings through said housing into said chambers, said diaphragm having a substantially cylindrical portion concave with respect to one of said chambers, a rigid support for the diaphragm at the end of and within the concavity thus formed, a spirally wound resilient coil within said concavity for supporting said diaphragm, one end of said coil being attached to said rigid support and adjacent turns of the other end of said coil being joined.

2. In combination, a housing, a flexible diaphragm separating the space within said housing into two chambers, said diaphragm having a substantially cylindrical portion concave with respect to one of said chambers, a rigid support for the diaphragm at the end of and within the concavity thus formed, a spirally wound resilient coil within said concavity for supporting said diaphragm, one end of said coil being attached to said rigid support, and a rod attached to said diaphragm and to said rigid support and extending movably through said housing.

3. In combination, a housing, a flexible diaphragm separating said housing into two chambers, said diaphragm having a substantially cylindrical portion concave to one of said chambers and of less diameter than the housing, and said diaphragm having a flat rim extending inwardly from the junction with said housing and meeting said substantially cylindrical portion in a curve of relatively large radius, whereby sharp bending of said diaphragm due to axial motion thereof is avoided, and a coil spring carried by said diaphragm inside the cylindrical portion thereof to support it from collapse.

4. In combination, a housing comprising two members, a flexible diaphragm having a substantially cylindrical concave portion and a flat rim, said flat rim being clamped between said housing members and extending inwardly from the housing, said cylindrical portion meeting in a gentle curve of relatively large radius, whereby sharp bending of the diaphragm due to axial motion thereof is avoided, and a coil spring carried by said diaphragm inside the cylindrical portion thereof to support it from collapse.

5. In combination, a housing comprising two members, a flexible diaphragm having a substantially cylindrical concave portion and a flat rim, said flat rim being clamped between said housing members and extending inwardly from the housing and meeting said substantially cylindrical portion in a gentle curve of relatively large radius, a rigid support for the diaphragm at the end of and within the concave portion, a spirally wound resilient coil within the substantially cylindrical concave portion for supporting the diaphragm, one end of said coil being attached to said rigid support and adjacent turns of the other end of said coil being joined, and a member connected to said diaphragm and extending movably through the housing.

6. In combination, a housing comprising two opposed concave sheet metal members, a flexible diaphragm having a substantially cylindrical concave portion and a flat rim, said flat rim being clamped between said housing members and extending inwardly from the housing and meeting said substantially cylindrical portion in a gentle curve of relatively large radius, a rigid support for the diaphragm at the end of and within the concave portion, a spirally wound resilient coil within the substantially cylindrical concave portion for supporting the diaphragm, a rod attached to said diaphragm and to said rigid support and extending movably through one of said housing members, means on the end of said last-mentioned housing member for mounting the housing, and a plate attached to the outside of said last-mentioned housing member for reinforcing said end against force on the housing directed axially toward said end.

7. In a fluid pressure power actuator the combination of: a generally cylindrical housing; a flexible diaphragm in said housing comprising a nearly radial end portion, a flat rim and a cylindrical portion connecting said rim and said end, said rim being clamped around its outer edge to said housing, said diaphragm being freely movable in said housing, so that said end portion may travel axially from one end of said housing to the other; and a coil spring carried within the cylindrical portion of said diaphragm for supporting the same against collapse.

8. An actuator as defined in claim 7 which includes a plate held against the inside of the end portion of said diaphragm, one end of said spring being fastened to said plate.

RALPH R. GUNDERSON.